(12) United States Patent
Park

(10) Patent No.: US 12,152,715 B2
(45) Date of Patent: Nov. 26, 2024

(54) CHAINED FIREPROOF SEALING SYSTEM

(71) Applicant: Ki Tae Park, Pyeongtaek-si (KR)

(72) Inventor: Ki Tae Park, Pyeongtaek-si (KR)

(73) Assignee: Ki Tae Park, Pyeongtaek-si (KR)

( * ) Notice: Subject to any disclaimer, the term of this patent is extended or adjusted under 35 U.S.C. 154(b) by 291 days.

(21) Appl. No.: 17/613,078

(22) PCT Filed: May 20, 2020

(86) PCT No.: PCT/KR2020/006567
§ 371 (c)(1),
(2) Date: Nov. 21, 2021

(87) PCT Pub. No.: WO2021/075656
PCT Pub. Date: Apr. 22, 2021

(65) Prior Publication Data
US 2022/0403956 A1    Dec. 22, 2022

(30) Foreign Application Priority Data

Oct. 14, 2019    (KR) .......................... 10-2019-0126848

(51) Int. Cl.
*F16L 5/04*        (2006.01)
*A62C 2/06*        (2006.01)
*F16J 15/06*       (2006.01)

(52) U.S. Cl.
CPC .............. *F16L 5/04* (2013.01); *F16J 15/065* (2013.01); *A62C 2/065* (2013.01)

(58) Field of Classification Search
CPC ... F16L 5/04; F16L 5/10; F16J 15/065; A62C 2/065
See application file for complete search history.

(56) References Cited

U.S. PATENT DOCUMENTS

| 3,528,668 | A | * | 9/1970 | Barton | F16J 15/00 |
| | | | | | 277/621 |
| 3,649,034 | A | * | 3/1972 | Barton | F16L 5/08 |
| | | | | | 277/606 |
| 3,703,297 | A | * | 11/1972 | Gignac | F16L 55/04 |
| | | | | | 277/621 |
| 5,213,341 | A | * | 5/1993 | Griffiths | F16L 5/08 |
| | | | | | 277/621 |
| 5,290,073 | A | * | 3/1994 | Chen | H02G 3/22 |
| | | | | | 277/621 |
| 5,340,123 | A | * | 8/1994 | Griffiths | F16L 5/08 |
| | | | | | 277/621 |
| 5,697,194 | A | * | 12/1997 | Gignac | G02B 6/4471 |
| | | | | | 52/220.8 |
| 6,477,813 | B2 | * | 11/2002 | Andresen | F16L 5/04 |
| | | | | | 52/220.8 |
| 6,641,143 | B2 | * | 11/2003 | Richter | F16J 15/065 |
| | | | | | 277/606 |

(Continued)

*Primary Examiner* — Nicholas L Foster

(57) ABSTRACT

The present invention discloses a system installed around a penetration hole of a pipe penetrating wall structure which divides a certain space and sealing the penetration hole in case of fire, which comprises a housing unit, a connecting unit and a fixing unit. A housing unit forming a body and having a predetermined accommodatable space, a connecting unit connected to the housing unit, interconnecting the housing unit in a series and a fixing unit arranged at a side of the housing unit, fixing the housing unit to the wall structure.

8 Claims, 5 Drawing Sheets

(56) References Cited

U.S. PATENT DOCUMENTS

| | | | | |
|---|---|---|---|---|
| 8,776,462 B2* | 7/2014 | Foerg | ................ | A62C 2/065 |
| | | | | 52/220.8 |
| 2002/0056242 A1* | 5/2002 | Andresen | ................ | F16L 5/04 |
| | | | | 52/220.8 |
| 2003/0137112 A1* | 7/2003 | Richter | ................ | F16L 5/04 |
| | | | | 277/627 |
| 2013/0104475 A1* | 5/2013 | Foerg | ................ | A62C 2/065 |
| | | | | 52/232 |

* cited by examiner

[FIG.1]
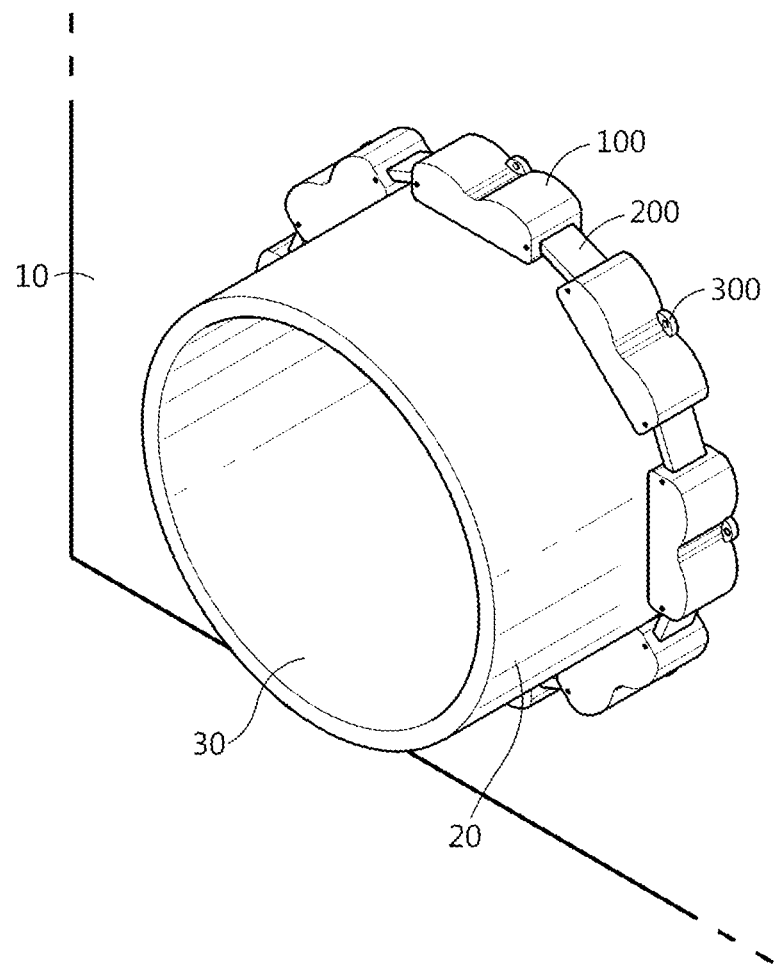

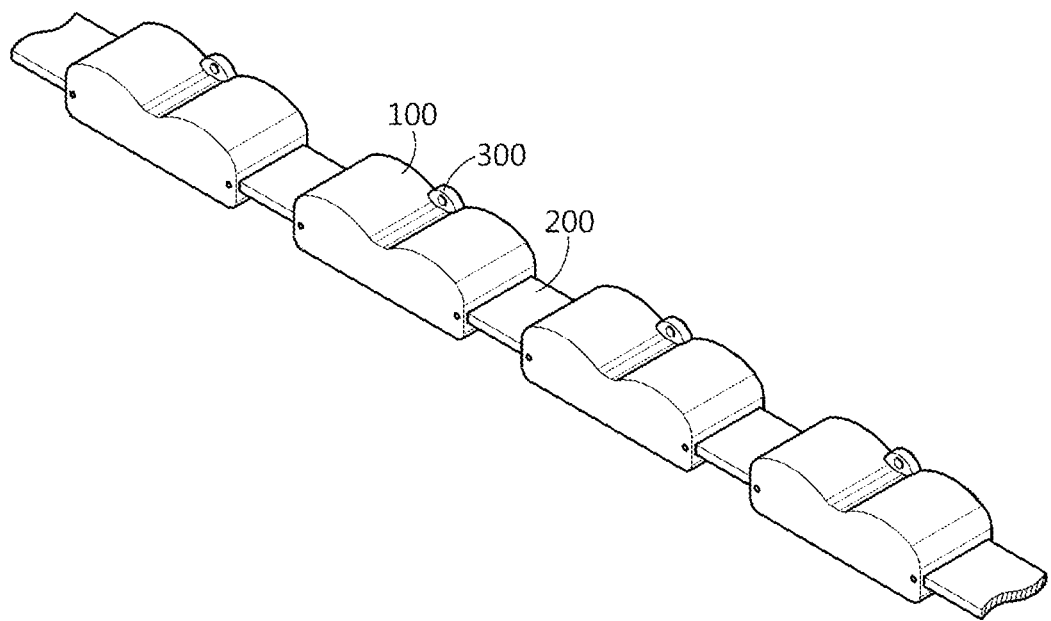
[FIG.2]

[FIG.3]
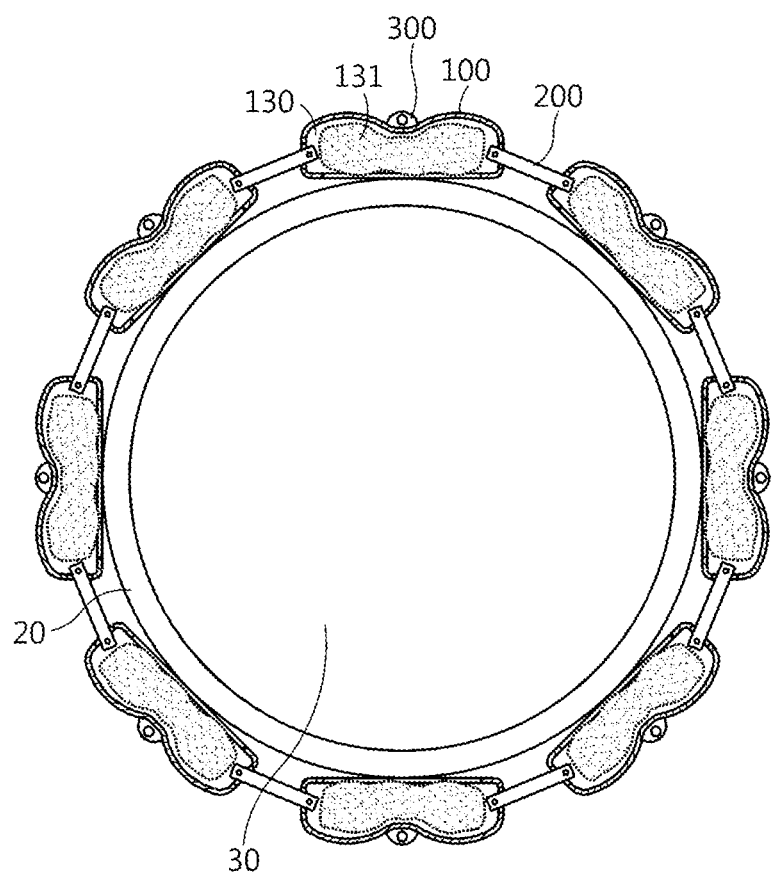

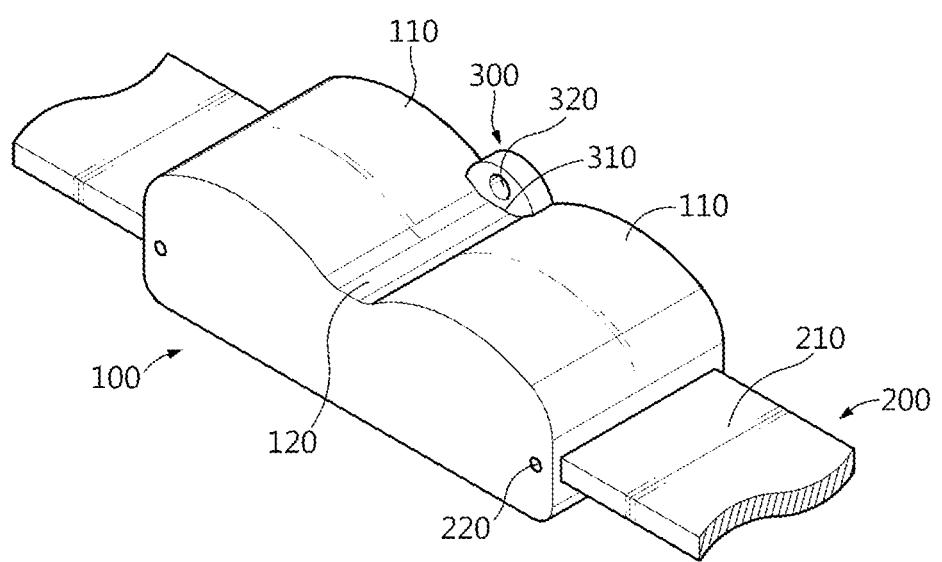
[FIG.4]

[FIG.5]
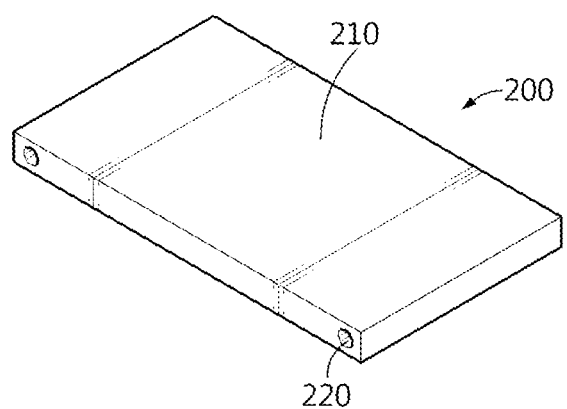

CHAINED FIREPROOF SEALING SYSTEM

TECHNICAL FIELD

The present invention discloses chained fireproof foam sealing system. More specifically, the system is easily cut out and conveniently applied and fireproof foaming materials expands to be sprayed inward a penetration hole and seals it. Also, the system is tied up with several pieces in order to prevent being detached from a penetration hole.

BACKGROUND

As buildings get higher and larger, which makes the risk of a big fire increasing, and there is indeed a need for effective fireproof system.

Every building has fire compartment treatments in cables, pipes and ducts penetrating floors and wall structures inside a building as building types and intended use and there have been serious weaknesses mostly because of improper maintenance. The weak point works as a flue, a passage for rapid spreading of flames and toxic gases in case of fire, which increases a risk for casualties and property losses.

In preparation for a disaster, installation of fireproof system around penetration areas such as cables, pipes and ducts minimize damages from fires, preventing spread of various toxic gases and flames.

Related to the present invention, there is a previous art, "FIRE STOP STRUCTURE USING EXPANDABLE SLEEVE(Korean Patent No. 10-1361647, the prior art 1)."

The prior art 1 relates to a fireproof filling material fixing frame which fixes a fireproof filling material formed to a through-hole of a slab layer or to the inside of a penetrated sleeve, which is buried into the slab layer or the through-hole of an interlayered slab layer and of which the top and the bottom are penetrated, in order to prevent fire and smoke from being rapidly spread to an upper story or adjoining rooms via the penetrated sleeve in the event of fire. The fireproof filling material made of a metal can be simply and easily fixed to a through-hole of a slab layer or to the inside of a penetrated sleeve without a separate joining member so that the through-hole of the slab layer or the penetrated sleeve can be completely closed as the fireproof filling material is expanded by the heat of flames in the event of fire. Furthermore, the diameter of the fixing frame can be easily changed so that the fixing frame can obtain a remarkable effect of being utilized regardless of the radius of the through-hole of the slab layer or the penetrated sleeve.

[8] The second previous art is "(Korean Patent No. 10-2017-0084970, the prior art 2)."

Patent Document 2 relates to a socket for a formable fireproof filler, the purpose of which is to form a receiving part that can be filled with cement on the outside of the fireproof filler or to form a metal wall so that the fireproof filler that is foamed in the event of a fire is a PVC granular pipe It expands only to the inside of the tube to seal the fire compartment faster and more reliably even with a small capacity, reducing costs and improving sealing stability. And labor cost is reduced and the foaming guide hole is formed in the lower part of the fireproof filler seat so that in case of fire, the fireproof filler foams faster and seals the fire compartment, preventing the spread of fire and inducing fire extinguishing. It is to provide a socket for formable fire-resistance fillers that can check whether the fire-resistance filler is installed or not. The invention of Patent Document 2 for achieving the above object forms a ring-shaped fire-resistant filler seat 11 so that the fire-resistant filler 30 surrounds the outer peripheral surface of the PVC standing pipe 20, and the portion supporting the bottom of the fire-resistant filler 30 is A PVC standing duct holding part 112 is formed to surround the outer circumferential surface of the PVC riser pipe 20 and pressurized to fix it, and the inner face surrounding and supporting the outer circumferential surface of the fire resistant filler 30 is formed as a socket body (10). It is constructed so that the fire-resistance filler is foamed only inside the PVC riser pipe during fire prevention, but the fire-resistant filler seating part 11 forms a plurality of through holes at equal intervals in the lower portion for rapid foaming by transferring the flame and heat. Its technical gist is that it relates to a socket for a formable fire resistant filler in which the guide hole 111 is formed.

The third prior art is "FIREPROOF JACKET(Korean Patent No. 10-2018-0124620, the prior art 3)."

The prior art 3 relates to fireproof jacket and one of embodiments provides a new structure of fireproof jacket having plastic pipes installed at penetration holes such as building walls, floors and ceilings, which makes fireproof structure constructed easily and shortly.

However, according to the prior art 1, there is a weakness that it is difficult to manufacture and install because frames to fix fireproof foam stopping materials form horizontal prop, vertical prop, ventilation window, body part, rack part and settling part.

According to the prior arts, there is also a weakness that it is hard to regulate the sizes of fireproof devices and inconvenient to install them because of the standardized and different sizes of pipes of the fireproof devices installed in a penetration hole of pipes.

SUMMARY OF THE INVENTION

According to the present invention, chained fireproof foam sealing system originated to solve the previous problems presents tasks as follows.

First, it is to construct fireproof system in order to prevent various harmful gases and flames in case of fire spreading through a pipe penetrating wall structure which divides a certain space inside a building.

Second, the installation of chained fireproof foam sealing system in a penetration hole of a pipe is to prevent by sealing a penetration pipe if the pipe is damaged from fire.

Third, chained fireproof foam sealing system is arbitrarily cut up by the diameter size of a pipe and conveniently installed and prevents breaking away from a pipe with fixing several pieces.

The object of the present invention is not limited by the features described above, and other unmentioned tasks to solve should be clearly understood by the skilled artisan with the details below.

According to the present invention, chained fireproof fire sealing system has solutions for the tasks to solve as follows.

According to the present invention, chained fireproof fire sealing system is installed in a penetration pipe penetrating wall structure which divides a certain space and as a system sealing the penetration hole in case of fire, comprises a housing unit forming a body and having a designated accommodatable space, a connecting unit connected to the housing unit, interconnecting the housing unit in a series, and a fixing unit arranged at a side of the housing unit, fixing the housing unit to the wall structure.

According to the present invention, the housing unit comprises a roof face forming domed uneven structure on the external side of the housing unit, a bridge face linking the roof face and a chamber corresponding to the predetermined accommodatable space inside the housing unit.

According to the present invention, the chamber has fireproof foaming materials which expand when a heat energy exceeding a threshold value affects the chamber.

According to the present invention, the chamber is contacted to the outer surface of the pipe and is arranged toward the inner diameter of the pipe, and the fireproof foaming materials expand toward the inner space of the penetration hole and seals the penetration hole when the pipe is damaged by the heat energy.

According to the present invention, the connecting unit comprises a supporting cover which covers the connecting unit and a chain link having one or more combining hole in order to combine with the housing unit.

According to the present invention, the supporting cover covers the outer diameter of the pipe neighboring the outer diameter in order that the fireproof foaming materials expand only toward the penetration hole.

According to the present invention, the chain link comprises the combining hole of the chain link connected to one side of the housing unit in a chain form, which possibly makes it hinge-bend.

According to the present invention, the fixing unit comprises an attaching part attached and fixed to one side of the housing unit and a fixing part having a fixing hole which fixes the housing unit on the wall structure.

According to the present invention, the fixing unit fixes the housing unit with a driving nail through the fixing hole on the wall structure in order to prevent the housing unit from being detached from the penetration hole of the pipe.

According to the present invention, the connecting unit arbitrarily cut in units of the connecting unit, so that the length of the housing unit connected in a series is arbitrarily adjusted, so that it is randomly matched according to the diameter size of the pipe.

According to the present invention, chained fireproof foam sealing system provides effects as follows.

First, to prevent various harmful gases and flames in case of fire spreading penetrating pipes through wall structure inside a building leads to minimize damages from fire.

Second, chained fireproof foam sealing system installed in a penetration hole of a pipe seals the pipe if the pipe is damaged from heat.

Third, chained fireproof foam sealing system is arbitrarily cut up by the diameter size of a pipe and conveniently installed and prevents breaking away from a pipe fixing with several pieces.

The effect of the present invention is not limited thereto, and other effects unmentioned will be apparently considered by the skilled artisan as follows.

BRIEF DESCRIPTION OF DRAWINGS

FIG. 1 is a perspective view displaying an installation of chained foam sealing system around a penetration hole according to an embodiment of the present invention.

FIG. 2 is a perspective view displaying a housing unit interconnected in a series, which is connected to the connecting unit of the chained foam sealing system according to an embodiment of the present invention.

FIG. 3 is a diagram displaying an installation of chained foam sealing system around a penetration hole according to an embodiment of the present invention.

FIG. 4 is a perspective view displaying a combination of a housing unit and a connecting unit of chained foam sealing system according to an embodiment of the present invention.

FIG. 5 is a perspective view displaying a connecting unit of chained foam sealing system according to an embodiment of the present invention.

DETAILED DESCRIPTION OF THE INVENTION

According to the present invention, the chained foam sealing system can have various alterations and embodiments, and specific embodiments are shown in diagrams and demonstrated in detail. However, the scope of the present disclosure should be not limited by specific embodiments and the present disclosure may be variously modified and altered with addition, change, deletion or supplement of elements by those skilled in the art to which the present disclosure pertains without departing from essential features of the present disclosure. This is also included in the scope of the present invention's spirit.

FIG. 1 is a perspective view displaying an installation of chained foam sealing system around a penetration hole according to an embodiment of the present invention. FIG. 2 is a perspective view displaying a housing unit interconnected in a series, which is connected to the connecting unit of the chained foam sealing system according to an embodiment of the present invention. FIG. 3 is a diagram displaying an installation of chained foam sealing system in a penetration hole according to an embodiment of the present invention. FIG. 4 is a perspective view displaying a combination of a housing unit and a connecting unit of chained foam sealing system according to an embodiment of the present invention. FIG. 5 is a perspective view displaying a connecting unit of chained foam sealing system according to an embodiment of the present invention.

According to chained foam sealing system of the present invention, as shown in FIG. 1, chained foam sealing system is installed around a penetration hole 30 of a pipe 20 penetrating wall structure 10 dividing space and consists of inflammable materials to avoid spread of flames in case of fire, sealing the penetration hole of a pipe 20. The chained foam sealing system comprises a housing unit 100, a connecting unit 200 and a fixing unit 300.

As shown in FIG. 2 and FIG. 4, a housing unit 100 forms a body having designated accommodatable space.

According to the present invention, a housing unit 100 of chained foam sealing system includes a roof face 110, a bridge face 120 and a chamber 130.

First, a roof face 110 forms domed uneven structure on the outer side of a housing unit 100.

A bridge face 120 functions as making uneven structure connecting a dome and the other one of a roof face 110.

A chamber 130 has accommodatable space inside a housing unit 100.

As shown in FIG. 3, a chamber 130 preferably accommodates fireproof foaming materials which expand when a heat energy exceeding a threshold value affects the chamber.

More specifically, fireproof foaming materials 131 are called fireproof filling such as fire pad, firestop sealant, thermal insulation material or expanding tape.

The fireproof foaming materials 131 have excellent flexibility, adhesion, elasticity and water resistance due to hermetic filling as incombustible ones, remarkable adhesion simultaneously after water(moisture) evaporation and are preferably no-crack after hardening.

The fireproof foaming materials 131 rapidly and stably foams with small quantity and are able to seal a penetration hole 30.

Also, a chamber 130 faces towards the inner diameter of a pipe 20 contacting the outer face of a pipe 20. When the chamber is heated and the pipe 20 is damaged by the heat, fireproof foaming materials 131 contained in a chamber 130 expands inside the penetration hole 30 and seals the penetration hole 30 blocking spread of flames.

The boundary of a chamber 130 preferably expands outwards to cover firmly so that fireproof foaming materials 131 emit inside and expand in a penetration hole 30.

Not only a housing unit 100 contains fireproof foaming materials 131, but also they prevents a housing unit 10 coming out and emits only into the inside of a penetration hole 30 to cover as a fence when fireproof foaming materials 131 expand.

As shown in FIG. 2, a connecting unit 200 is connected to a housing unit 100, which makes a housing unit 100 interconnected in a series.

According to the present invention, a connecting unit 200 comprises a supporting cover 210 and a chain link 220.

A supporting unit consists of a main body of a connecting unit 200 covering the connecting unit 200.

As shown in FIG. 3, a supporting unit is preferably adjacent to the outer diameter of a pipe 20 covering the outer diameter of the pipe 20 in order to make fireproof foaming materials 131 expand only toward a penetration hole 30.

A chain link 220 has one or more combining holes in order to combine a housing unit 100.

As shown from FIG. 2 to FIG. 4, one side of a housing unit 100 is combined with a combining hole of a chain link 220 in a chain form, which makes hinge-bending motion.

The hinge-bending motion is used for combining more than two devices, which motion makes mechanical rotation in between the two devices. A housing unit 100 linked in a series by a hinge-attached chain link 220 is able to roll flexibly in a penetration hole 30 of a pipe 20 by mechanical rotation.

A connecting unit 200 arbitrarily cut by the size of a connecting unit 200 makes the length of the housing unit 100 connected in a series, arbitrarily regulated, and arbitrarily matched by the diameter size of a pipe 20.

For instance, a connecting unit 200 can conveniently be cut out and installed as necessary although the diameter sizes of pipes 20 inside a building are different.

As shown in FIG. 4, a fixing unit 300 is located on one side of a housing unit 100 and fixed on the wall structure of a housing unit 100.

A fixing unit 300 of the present invention comprises an attaching part 310 and a fixing part 320.

The attaching part 310 is attached and fixed on one side of a housing unit 100.

The attaching part 310 is formed in one housing unit 100 respectively, which is preferably located on a bridge face of a housing unit.

A fixing part 320 has a fixing hole to fix a housing unit 100 on wall structure.

A fixing unit 300 is fixed with a piece on wall structure, which prevents a housing unit 100 breaking away from a penetration hole 30 of a pipe 20.

Furthermore, a fixing unit 300 is preferably attached on one housing unit 100, which makes the length of a housing unit 100 arbitrarily regulated and fixed with a piece on wall structure regardless of the length of the housing unit 100.

The scope of the present disclosure should be determined by listed items, and the brackets of claims are listed not for optional limit but for clear elements, and contents of brackets should be understood as essential elements.

What is claimed is:

1. A system installed around a pipe, the pipe penetrating a wall structure which divides a certain space, the pipe having a penetration hole therein, the system attached to a face of the wall structure, and the system sealing the penetration hole in case of fire, wherein the system comprises:

a plurality of housing units each having a designated accommodatable space therein;

a plurality of connecting units each respectively connecting two of the housing units, interconnecting the housing units in a series which forms an annular chain configuration about the pipe; and a plurality of fixing units each arranged at a side of a respective one of the housing units, each respective fixing unit fixing the respective housing unit to the wall structure, wherein each housing unit comprises a chamber corresponding to the designated accommodatable space in an interior of the housing unit, and wherein each chamber has a fireproof foaming material therein which expands when a heat energy exceeding a threshold affects the chamber, and the fireproof foaming material, in an unexpanded condition, does not completely fill the chamber.

2. The system according to claim 1, wherein each housing unit comprises:

a roof face forming a domed uneven structure in an external side of the housing unit; and a bridge face linking the roof face.

3. The system according to claim 2, wherein the fireproof foaming materials expand toward an inner space of the penetration hole and seals the penetration hole when the pipe is damaged by the heat energy.

4. The system according to claim 2, wherein each connecting unit comprises:

one or more combining hole(s) located in a body of the connecting unit in order to combine with the respective housing unit.

5. The system according to claim 4, wherein each connecting unit has one side that is connected to an adjacent one of the housing units via the respective combining hole(s) in a chain form to enable hinge movement therebetween.

6. The system according to claim 1, wherein each fixing unit comprises:

an attaching part attached and fixed to one side of the respective housing unit; and a fixing part having a fixing hole which is for fixing the housing unit on the wall structure.

7. The system according to claim 6, wherein each fixing unit is configured to fix the respective housing unit to the wall structure via a nail through the fixing hole in order to prevent the housing unit from being detached from the wall structure.

8. The system according to claim 1, wherein the plurality of connecting units are cut into units with a specified length based on a size of the pipe, such that the housing units connected in a series via the plurality of connecting units surround the pipe with no gap or a gap having a specified width between the housing units and the pipe.

* * * * *